United States Patent
Ikeda et al.

(10) Patent No.: US 9,166,789 B2
(45) Date of Patent: Oct. 20, 2015

(54) CRYPTOGRAPHIC PROCESSING APPARATUS

(71) Applicant: Kabushiki Kaisha Toshiba, Tokyo (JP)

(72) Inventors: Hanae Ikeda, Tokyo (JP); Takeshi Kawabata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 13/768,085

(22) Filed: Feb. 15, 2013

(65) Prior Publication Data
US 2013/0236005 A1    Sep. 12, 2013

(30) Foreign Application Priority Data
Mar. 6, 2012    (JP) ................................ 2012-048919

(51) Int. Cl.
| | |
|---|---|
| *H04L 29/06* | (2006.01) |
| *H04L 9/28* | (2006.01) |
| *H04L 9/00* | (2006.01) |
| *G09C 1/00* | (2006.01) |
| *H04L 9/06* | (2006.01) |

(52) U.S. Cl.
CPC .. *H04L 9/28* (2013.01); *G09C 1/00* (2013.01); *H04L 9/003* (2013.01); *H04L 9/0631* (2013.01); *H04L 2209/12* (2013.01)

(58) Field of Classification Search
CPC .... H04L 9/28; H04L 9/0618; H04L 2209/043
USPC .......................................................... 380/28
See application file for complete search history.

(56) References Cited

U.S. PATENT DOCUMENTS

2008/0260145 A1*  10/2008  Trichina .......................... 380/46
2011/0268266 A1   11/2011  Fujisaki et al.

FOREIGN PATENT DOCUMENTS

| JP | 3600454 | 9/2004 |
| JP | 2010-141430 A | 6/2010 |

OTHER PUBLICATIONS

Office Action issued Apr. 22, 2014 in Japanese Patent Application No. 2012-048919 with English language translation.
Sumio Morioka, et al., "DPA attack to AES S-Box Circuits over Composite Fields", Proceedings of Computer Security Symposium 2004 (CSS2004), vol. II of II, Information Processing Society of Japan, vol. 2004, No. 11, Oct. 20, 2004, pp. 679-684 (with English abstract).

(Continued)

*Primary Examiner* — Jason K Gee
(74) *Attorney, Agent, or Firm* — Oblon, McClelland, Maier & Neustadt, L.L.P.

(57) ABSTRACT

According to an embodiment, a cryptographic processing apparatus performs processes to encrypt plain text or decrypt cipher text. The processes include a non-linear process using multiplication. The non-linear process is a process performed using intermediate data masked with mask data. The intermediate data is data in a middle of the plurality of processes. The mask data hides the intermediate data. The apparatus includes a non-linear processing unit configured to receive first data that is an exclusive OR of a product of the intermediate data and first mask data and second mask data, and output second data that is an exclusive OR of a product of data obtained by the non-linear process on the intermediate data and data obtained by the non-linear process on the first mask data and third mask data having a predetermined correspondence relation with the second mask data.

5 Claims, 10 Drawing Sheets

(56) References Cited

OTHER PUBLICATIONS

Extended European Search Report issued Mar. 31, 2014 in Patent Application No. 13155051.9.
Jovan D. Golić et al., "Multiplicative Masking and Power Analysis of AES", Lecture Notes in Computer Science/Computational Science (Eurocrypt) Ches 2008, vol. 2523, XP-002344149, Jan. 1, 2003, pp. 198-212.
Kouichi Itoh et al., "DPA Countermeasure Based on the Masking Method", Lecture Notes in Computer Science/Computational Science (Eurocrypt) Ches 2008, vol. 2288, XP-002322028, Dec. 1, 2001, pp. 440-456.
Thomas S. Messerges, "Securing the AES Finalists Against Power Analysis Attacks", Fast Software Encryption, XP-002240613, Apr. 10, 2000, pp. 150-164.
Paul Kocher et al, "Differential Power Analysis", Crypto 99, LNCS 1666, 1999, pp. 388-397.
NIST, Advanced Encryption Standard (AES), FIPS publication 197, Nov. 26, 2001, http://csnc.nist.gov/publications/fips/fips197/fips-197.pdf, 51 pages.
Mehdi-Laurent Akkar et al., "An Implementation of DES and AES, Secure against Some Attacks", Ches 2001, LNCS 2162 pp. 309-318.
Office Action issued Sep. 30, 2014 in Japanese Patent Application No. 2012-48919 (with English translation).

* cited by examiner

CRYPTOGRAPHIC PROCESSING APPARATUS

CROSS-REFERENCE TO RELATED APPLICATION

This application is based upon and claims the benefit of priority from Japanese Patent Application No. 2012-048919, filed on Mar. 6, 2012; the entire contents of which are incorporated herein by reference.

FIELD

Embodiments described herein relate generally to a cryptographic processing apparatus that performs encryption or decryption.

BACKGROUND

A cryptographic processing apparatus uses a specific algorithm to encrypt plain text and decrypt cipher text. A side channel attack on the cryptographic processing apparatus has been reported. The side channel attack includes passive attacks that simply measure power consumption or an electromagnetic wave during operation to derive an internal secret key, such as simple power analysis (SPA), differential power analysis (DPA), and similar analysis. The side channel attack leaves no evidence of the attack. Thus, there is a need for a countermeasure technique, and this is important.

The side channel attack is performed by deriving a secret key where power consumption or an electromagnetic wave has high similarity to intermediate data (data in the middle of an encryption process). The power consumption and the electromagnetic wave are measurable during operation of an encryption process or a decryption process. The intermediate data is calculated from a secret key to be estimated. The known countermeasure for the side channel attack includes a countermeasure method (mask countermeasure) that invalidates the side channel attack. This method uses a random number to hide the intermediate data of the encryption process, and makes it difficult to determine degree of similarity, thus invalidating the side channel attack.

In a typical block cipher method such as Advanced Encryption Standard (AES), a countermeasure employs a method that calculates an exclusive OR (XOR) between the intermediate data and the random number or a method that multiplies the intermediate data by the random number. Here, in the case where the mask countermeasure is applied to the non-linear process in the encryption process, the mask countermeasure using the exclusive OR with the random number, which is randomly generated, is not simply applicable due to the nature of the non-linear process. In view of this, a typical method uses a table that determines correspondence relation between input and output of the non-linear process to ensure the mask countermeasure in the non-linear process. However, in the mask countermeasure using the table, the number of tables to be used is limited in order to prevent a circuit size from significantly increasing. This reduces randomness.

On the other hand, the mask countermeasure using the multiplication of the random number works better with a non-linear process using the multiplication such as inverse operation of AES thanks to its mathematical property. However, vulnerability of the side channel attack has been reported.

Accordingly, in the known cryptographic processing apparatus, it has been difficult to take adequate countermeasures against the side channel attack, especially in the non-linear process. Therefore, there has been a need for enhancement of safety against the side channel attack.

DETAILED DESCRIPTION

According to an embodiment, a cryptographic processing apparatus performs a plurality of processes to encrypt plain text or decrypt cipher text. The plurality of processes include a non-linear process using multiplication. The non-linear process is performed using intermediate data masked with mask data. The intermediate data is data in a middle of the plurality of processes. The mask data hides the intermediate data. The apparatus includes a non-linear processing unit configured to receive first data that is an exclusive OR of A and B, where A is a product of the intermediate data and first mask data and B is second mask data, and output second data that is an exclusive OR of C and D, where C is a product of data obtained by the non-linear process on the intermediate data and data obtained by the non-linear process on the first mask data and D is third mask data having a predetermined correspondence relation with the second mask data.

Cryptographic processing apparatuses according to embodiments are cryptographic processing apparatuses that perform encryption and decryption in a block cipher method. Especially, the embodiments are application examples of a cryptographic processing apparatus using AES. An applicable cryptographic processing apparatus is not limited to the cryptographic processing apparatus using AES. The embodiments are widely applicable to a cryptographic processing apparatus that performs a non-linear process using multiplication in cryptography.

Overview of AES

First, an overview of AES will be described. A block cipher method of AES repeats a round process using a round function on a 128-bit data block by specified times of rounds corresponding to an AES key length. The round function of AES includes AddRoundKey, SubBytes, ShiftRows, and MixColumns.

AddRoundKey is an operation that processes each bit to output 128-bit data. The 128-bit data is obtained by calculating an exclusive OR between a 128-bit expansion key and 128-bit input data. The 128-bit expansion key is updated according to a key schedule that performs a process corresponding to the AES key length. SubBytes is an operation that separates the 128-bit input data into 16 portions of 8-bit data and performs, for example, a non-linear process using S-Box for each 8-bit data. ShiftRows is an operation that divides the 128-bit input data into 16 portions of 8-bit data and arranges the divided data. MixColumns is an operation that divides 128-bit input data into four portions of 32-bit data and performs a linear process for each 32-bit data.

Figure 1:
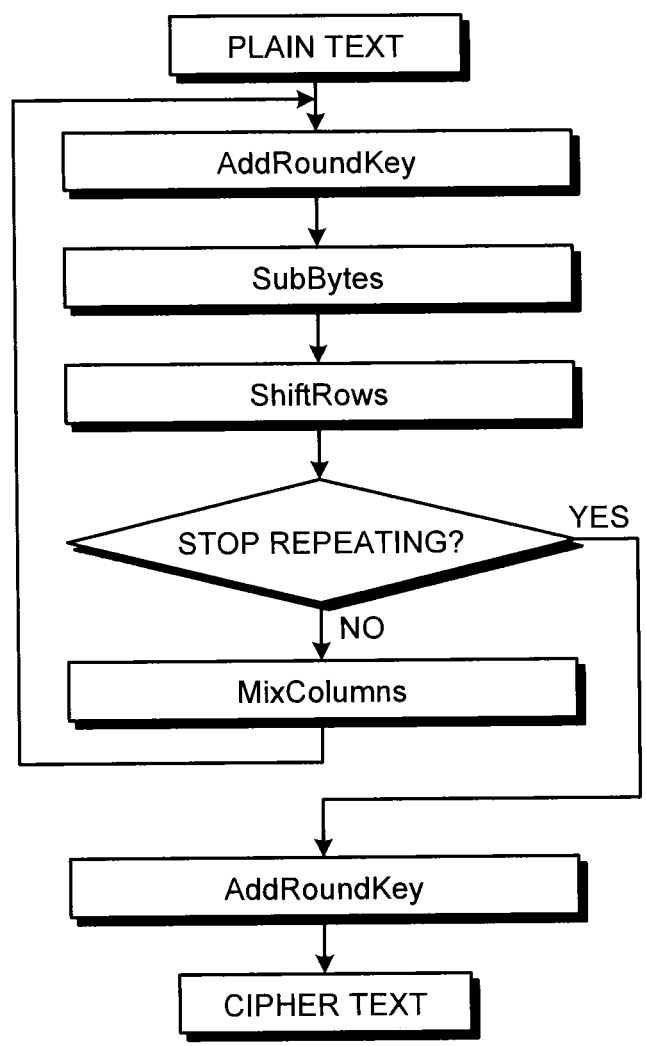
FIG. 1 is a flowchart illustrating an exemplary general procedure of AES.

FIG. 1 is a flowchart illustrating an exemplary general procedure of AES. A process of AES receives 128-bit plain text as illustrated in FIG. 1. For example, AddRoundKey, SubBytes, ShiftRows, and MixColumns are repeatedly performed in this order from the first round to a round prior to the final round. In the final round, the process performs AddRoundKey, SubBytes, and ShiftRows in this order. Subsequently, the process skips MixColumns and performs AddRoundKey again as a post process, thus outputting cipher text. While the procedure of the encryption process is illustrated in FIG. 1, a decryption process is performed with a similar procedure. In decryption process, the cipher text is input to perform an inverse transformation of the encryption process in SubBytes, ShiftRows, and MixColumns. Subsequently, the process outputs the plain text. The description of the process according to the key schedule is omitted in the drawing.

The round process of AES is divided into a non-linear process of SubBytes and linear processes other than SubBytes.

Figure 2:
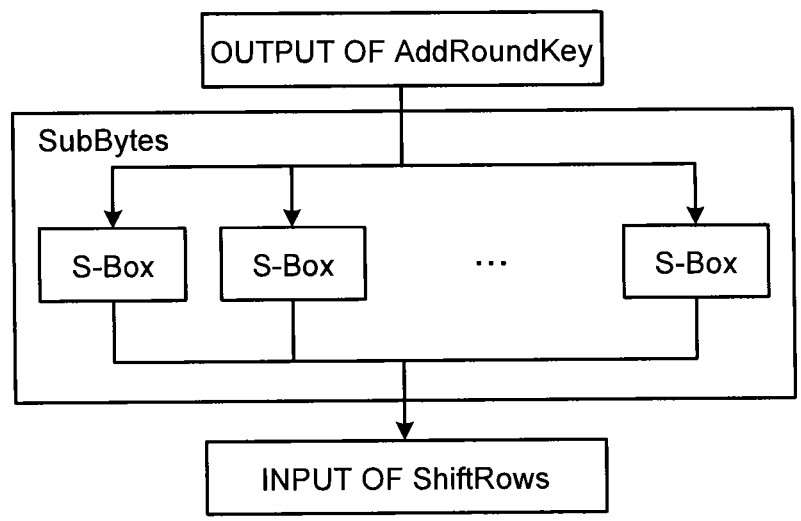
FIG. 2 is a conceptual block diagram illustrating exemplary SubBytes.

FIG. 2 is a conceptual block diagram illustrating exemplary SubBytes. For example, as illustrated in FIG. 2, SubBytes divides 128-bit output data of AddRoundKey into portions of 8-bit data. SubBytes performs S-Box for each 8-bit data, thus inputting the data to ShiftRows.

Figure 3:
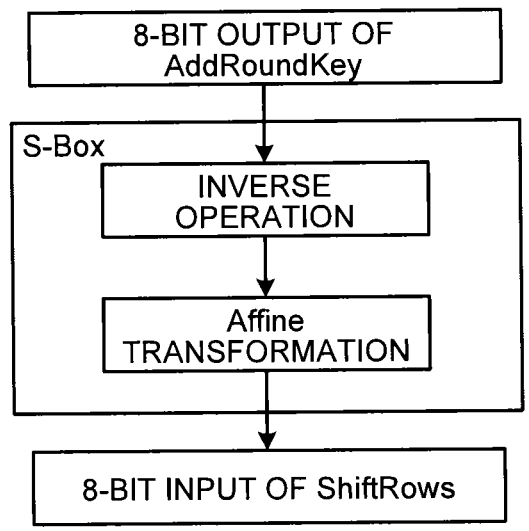
FIG. 3 is a conceptual block diagram illustrating S-Box.

FIG. 3 is a conceptual block diagram illustrating S-Box. As illustrated in FIG. 3, S-Box receives the 8-bit data in the output data of AddRoundKey. S-Box performs an inverse operation, which is a non-linear process, and Affine transformation, which is a linear process, on the input 8-bit data, thus outputting data to be used as the 8-bit input data of ShiftRows.

The inverse operation is a non-linear process that transforms input data X into reciprocal $X^{-1}$ on an extension field $GF(2^8)$. The inverse operation is performed by repetitive operations of multiplication on the extension field $GF(2^8)$.

Inverse operation: $X^{-1} \leftarrow F(X)$

Here, the correspondence relation from X to $X^{-1}$ is uniquely defined and is generally expressed as a table. This embodiment also describes an inverse operation using a table. The inverse operation is used in common between the encryption process and the decryption process of AES. Therefore, implementing S-Box using the inverse operation allows reduction in circuit size for hardware implementation and reduction in memory for software implementation.

Figure 4:
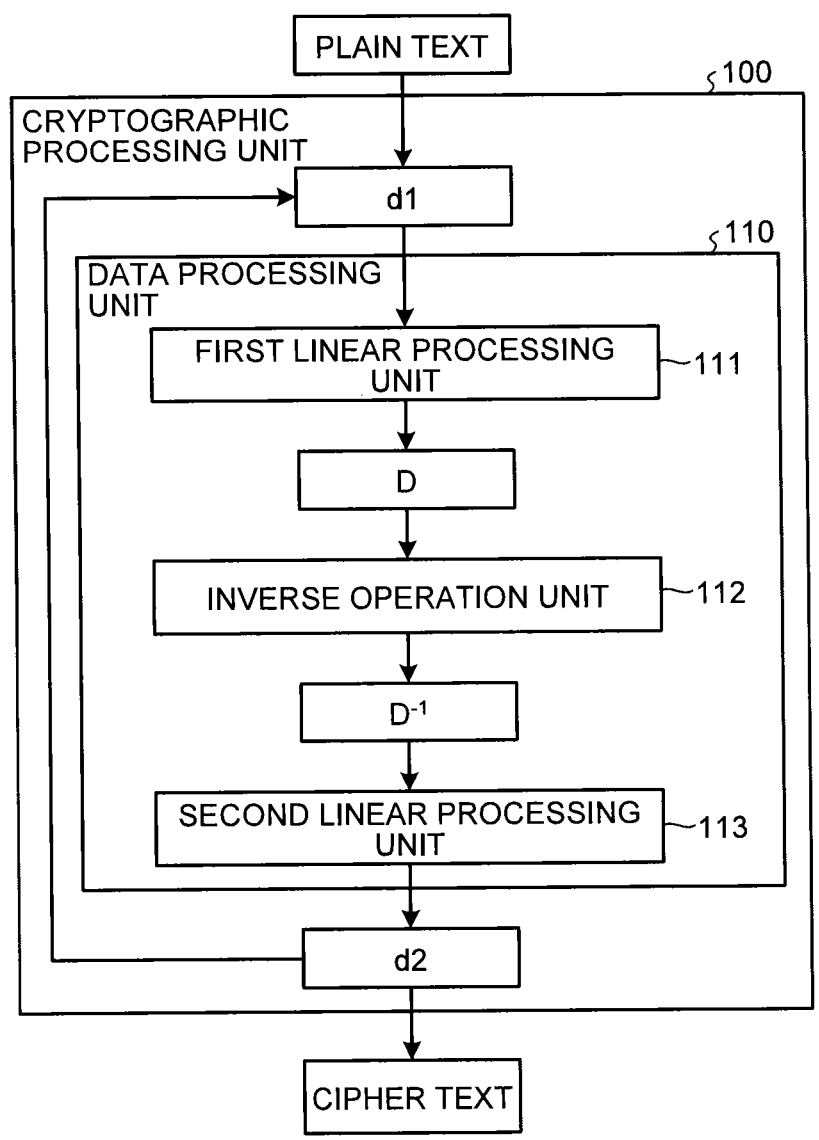
FIG. 4 is a schematic block diagram illustrating a cryptographic processing unit.

FIG. 4 is a schematic block diagram illustrating a cryptographic processing unit 100 that performs an encryption process and a decryption process of AES. The example in FIG. 4 schematically illustrates the encryption process of AES using linear processes and a non-linear process (inverse operation).

The cryptographic processing unit 100 processes the input plain text at a data processing unit 110 and outputs the processed data as cipher text. The data processing unit 110 transforms input data d1 into data d2 and outputs the transformed data. The data processing unit 110 includes a first linear processing unit 111, an inverse operation unit 112, and a second linear processing unit 113. The first linear processing unit 111 performs a linear process L1 (expressed by D=L1 (d1)) that transforms data d1 into data D, thus outputting the data D. The inverse operation unit 112 performs a non-linear process F (expressed by $D^{-1}=F(D)$) that transforms data D into reciprocal $D^{-1}$ on the extension field $GF(2^8)$, thus outputting the data $D^{-1}$. The second linear processing unit 113 performs a linear process L2 (expressed by $d2=L2(D^{-1})$) that transforms data $D^{-1}$ into data d2, thus outputting the data d2.

The linear process L1 by the first linear processing unit 111 is AddRoundKey of the round function in AES. The non-linear process F by the inverse operation unit 112 is inverse operation of S-Box that performs SubBytes. The linear process L2 by the second linear processing unit 113 performs Affine transformation of S-Box, ShiftRows, and MixColumns in this order from the first round to the round prior to the final round. The linear process L2 performs Affine transformation of S-Box, ShiftRows, and AddRoundKey in this order in the final round.

In the first round, the cryptographic processing unit 100 inputs the input plain text to a data processing unit 110 as data d1. Then, from the second round to the final round, the cryptographic processing unit 100 inputs the data d2 output from the data processing unit 110 in the previous round, to the data processing unit 110 as data d1. In the final round, the cryptographic processing unit 100 outputs the data d2, which is output from the data processing unit 110, as cipher text.

The procedure of the processes in the cryptographic processing unit 100 is summarized as the following 1 to 5.
1. Input plain text
2. First round
   Set plain text as data d1.
   Linear process L1 (AddRoundKey)
   Nonlinear process F (inverse operation)
   Linear process L2 (Affine transformation→ShiftRows→MixColumns)
3. From the second round to the round prior to the final round
   d1←d2
   Linear process L1 (AddRoundKey)
   Nonlinear process F (inverse operation)
   Linear process L2 (Affine transformation→ShiftRows→MixColumns)
4. Final round
   d1←d2
   Linear process L1 (AddRoundKey)
   Nonlinear process F (inverse operation)
   Linear process L2 (Affine transformation→ShiftRows→AddRoundKey)
   Cipher text←d2
5. Cipher text is output.

Cryptographic Processing Apparatus According to each Embodiment

Next, a cryptographic processing apparatus according to each embodiment will be described. The cryptographic processing apparatus according to each embodiment is a cryptographic processing apparatus where safety against a side channel attack is enhanced. A typical countermeasure against a side channel attack performs a process to always hide (mask) data X using mask data such as a random number. The data X is data in the middle of the encryption process or the decryption process (such as data d1, d2, and D described above. Hereafter, the data in the middle of processing is referred to as intermediate data.). The following method is referred to as a mask countermeasure. The mask countermeasure masks plain text using the mask data, performs the encryption process, removes (unmask) the mask data, and finally outputs cipher text. The mask data represents data that is used for hiding (masking) data. In other words, all data used for the mask countermeasure is generally referred to as the mask data in addition to a random number.

Hereafter, an exclusive OR (XOR) of the mask data R with the intermediate data X is expressed by X (+) R. The mask data R is referred to as an XOR mask. Masking the intermediate data X generally employs the mask data R with a bit length equal to a bit length of the intermediate data X.

In the mask countermeasure using the XOR mask, a linear process L satisfies a relation where L(X (+) R) is equal to L(X) (+) L(R). Therefore, the mask countermeasure works better with the linear process L. That is, the mask countermeasure separately performs an operation L(X (+) R) on the intermediate data masked with the XOR mask and an operation L(R) on the XOR mask. In the event that the XOR mask is finally removed, an exclusive OR between the data obtained in both the operations is calculated. This provides a correct result. At this time, L(X) does not need to be directly calculated (that is, calculation is not performed on the unmasked true intermediate data X). Accordingly, the encryption process and the decryption process are performed while the intermediate data X is always hidden with the mask data.

On the other hand, the non-linear process F satisfies a relation where the F(X (+) R) is not equal to F(X) (+) F(R). This does not allow removal of the XOR mask after performing the non-linear process F. That is, a problem arises in that it is not possible that the exclusive OR between the intermediate data X and the mask data R, which is expressed by X (+) R, is directly input to the non-linear process F. As one method to solve this problem, a known typical method uses $T_{mi,mo}$ described below instead of F.

F(X) (+) mo is obtained by $T_{mi,mo}$ (X (+) mi) where $T_{mi,mo}$ expresses a non-linear process. $T_{mi,mo}$ uses mi and mo, which is in a predetermined correspondence relation with mi, as XOR masks. $T_{mi,mo}$ outputs F(X) (+) mo using X (+) mi as input. Hereinafter, this type of non-linear process is referred to as a non-linear process with XOR mask. Mi and mo are XOR masks that are mask data used in a non-linear process. In this embodiment, mi and mo are referred to as table masks in order to distinguish them from ordinary XOR masks.

The non-linear process F that transforms 8-bit input data to 8-bit output data needs a table with size of 8 bit by 256. In the case where the table masks mi and mo are fixed data, a table size of the non-linear process $T_{mi,mo}$ with XOR mask is 8 bit by 256, similarly to the non-linear process F. In the case where the non-linear process $T_{mi,mo}$ with XOR mask prepares tables for all possible combinations of the table masks mi and mo, 65536 (which is equal to 256 multiplied by 256) of tables with sizes of 8 bit by 256 are needed.

In software implementation, the process may be performed as follows. The process randomly selects the table masks mi and mo for each execution of the non-linear process F, and re-generates tables of the non-linear process $T_{mi,mo}$ with XOR mask. In hardware implementation, the non-linear process $T_{mi,mo}$ with XOR mask is usually implemented for respective data of the table masks mi and mo as a combinational circuit. In view of this, preparing tables of the non-linear process $T_{mi,mo}$ with XOR mask for all combinations of the table masks mi and mo significantly increases in circuit size. Then, only "n" sets of tables, which are less than 65536 tables, are prepared. Subsequently, one table is selected among the "n" sets of tables for each execution of the non-linear process F. This means that possible pairs of table masks mi and mo for the non-linear process F are limited to "n" pairs. Also in software implementation, implementation that regenerates tables of the non-linear process $T_{mi,mo}$ with XOR mask for each execution of the non-linear process F increases in processing time. Accordingly, applying a method that limits the table number is effective.

However, limitation of the table number of the non-linear process $T_{mi,mo}$ with XOR mask limits available data of the table mask mi and mo. This reduces randomness, and may cause vulnerability to the side channel attack. Therefore, in the cryptographic processing apparatus in each embodiment, the mask countermeasure with multiplication of a random number is applied to the non-linear process $T_{mi,mo}$ with XOR mask. This prevents reduction of randomness in the non-linear process $T_{mi,mo}$ with XOR mask, and enhances safety against the side channel attack.

Figure 5:
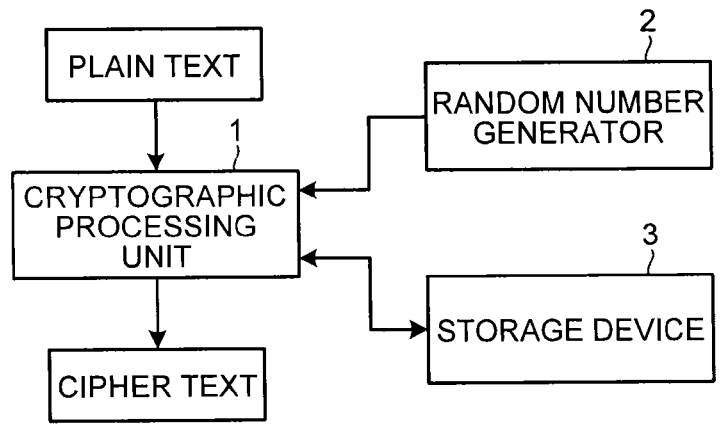
FIG. 5 is a schematic block diagram illustrating a cryptographic processing apparatus according to an embodiment.

FIG. 5 is a schematic block diagram illustrating a cryptographic processing apparatus according to each embodiment. The cryptographic processing apparatus of each embodiment includes a cryptographic processing unit 1, a random number generator 2, and a storage device 3. The cryptographic processing unit 1 encrypts plain text and outputs cipher text in the encryption process. The cryptographic processing unit 1 decrypts cipher text and outputs the plain text in the decryption process. At this time, the cryptographic processing unit 1 uses a random number generated by the random number generator 2 and the table masks mi and mo stored in the storage device 3, so as to mask the intermediate data in the encryption process. In the case where the tables of the non-linear process $T_{mi,mo}$ with XOR mask are implemented as a circuit, the cryptographic processing apparatus according to each embodiment does not need to have the storage device 3.

Figure 6:
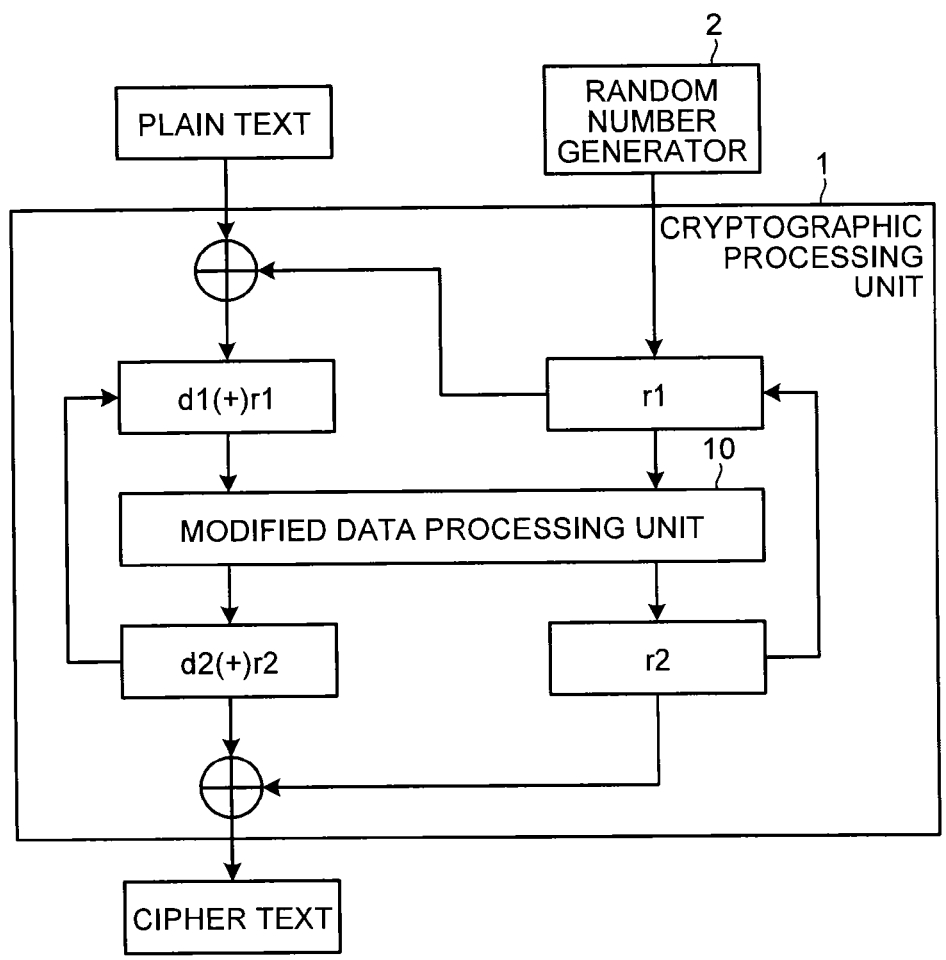
FIG. 6 is a schematic block diagram illustrating a cryptographic processing unit.

FIG. 6 is a schematic block diagram illustrating a cryptographic processing unit 1. The cryptographic processing apparatus in each embodiment includes the cryptographic processing unit 1 where the cryptographic processing unit 100 in FIG. 4 employs the mask countermeasure.

The cryptographic processing unit 1 calculates an exclusive OR with plain text by using the random number generated by the random number generator 2 as an XOR mask r1. Subsequently, the cryptographic processing unit 1 inputs intermediate data of d1 (+) r1, which is masked with the XOR mask r1, and the XOR mask r1 to a modified data processing unit 10. The modified data processing unit 10 outputs intermediate data of d2 (+) r2, which is masked with the XOR mask r2, and the XOR mask r2. While this algorithm performs a specified number of rounds, the cryptographic processing unit 1 repeatedly performs the process in the modified data processing unit 10. This process inputs the data of d2 (+) r2, which is output from the modified data processing unit 10 in the previous round, and r2 as input (d1 (+) r1 takes d2 (+) r2, while r1 takes r2) to the modified data processing unit 10 for the next round. Subsequently, in the event that the process of the modified data processing unit 10 in the final round is completed, the cryptographic processing unit 1 removes the mask by calculating an exclusive OR between d2 (+) r2 and r2, which are output from the modified data processing unit 10. The cryptographic processing unit 1 consequently outputs d2 as cipher text.

Figure 7:
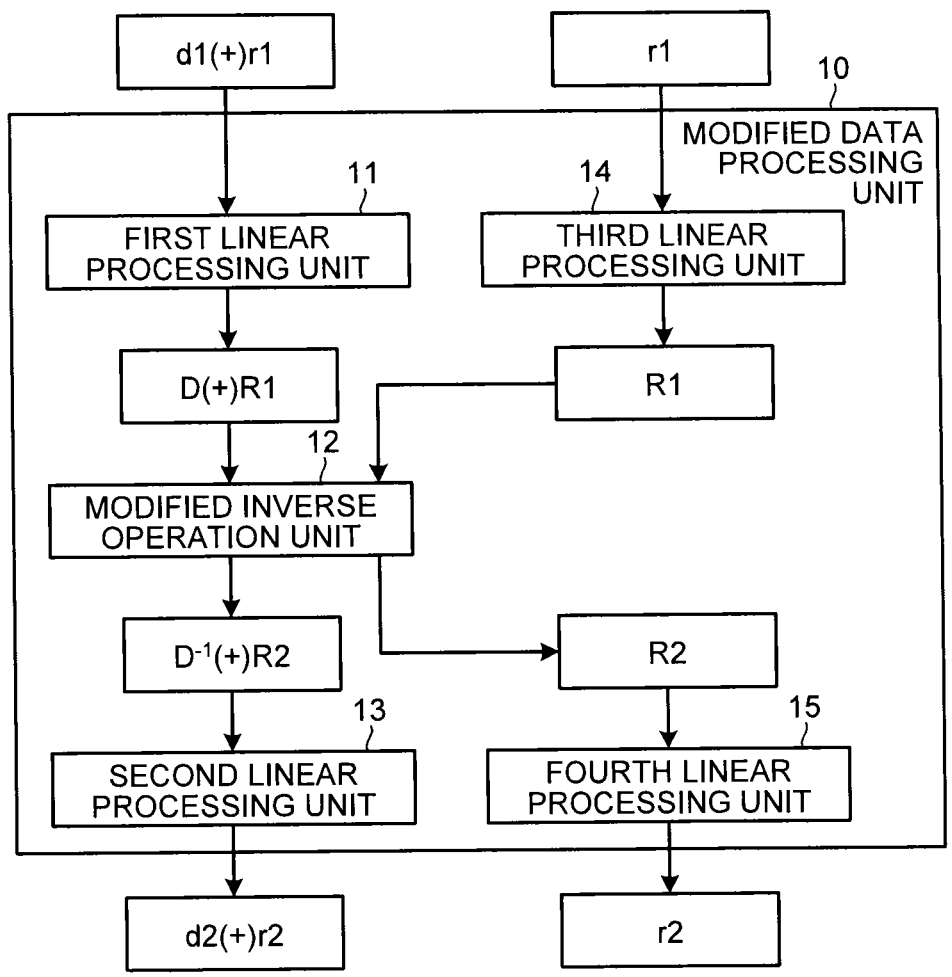
FIG. 7 is a schematic block diagram illustrating an overview of a modified data processing unit.

FIG. 7 is a schematic block diagram illustrating the overview of the modified data processing unit 10. The modified data processing unit 10 includes a first linear processing unit 11, a modified inverse operation unit 12, a second linear processing unit 13, a third linear processing unit 14, and a fourth linear processing unit 15.

The first linear processing unit 11 performs the linear process L1 on the data of d1 (+) r1, which is input to the modified data processing unit 10, so as to output the data of D (+) R1. The third linear processing unit 14 performs the linear process L1 on the data of r1, which is input to the modified data processing unit 10, so as to output the data of R1. Here, D is equal to L1(d1), while R1 is equal to L1(r1).

The modified inverse operation unit 12 receives the data of D (+) R1, which is output from the first linear processing unit 11, and the data of R1, which is output from the third linear processing unit 14, so as to output the data of $D^{-1}$ (+) R2 and R2. The modified inverse operation unit 12 employs the non-linear process $T_{mi,mo}$ with XOR mask to which the mask countermeasure with multiplication of the random number is applied. A concrete example of the modified inverse operation unit 12 will be described in detail below.

The second linear processing unit 13 performs the linear process L2 on the data of $D^{-1}$ (+) R2, which is output from the modified inverse operation unit 12, so as to output d2 (+) r2. The fourth linear processing unit 15 performs the linear process L2 on the data of R2, which is output from the modified inverse operation unit 12, so as to output the data of r2. Here, d2 is equal to $L2(D^{-1})$, while r2 is equal to L2(R2).

Next, a description will be given of a concrete example of the modified inverse operation unit 12 according to each embodiment (a first embodiment to a third embodiment). This concrete example is compared with a configuration example (a first comparative example) that does not employ the mask countermeasure with multiplication of the random number and a configuration example (a second comparative example) that employs the mask countermeasure with multiplication of the random number alone. Hereinafter, "n" sets of tables of the non-linear process $T_{mi,mo}$ with XOR mask each employ a table number s (s=1, 2, . . . , and n) to distinguish them from one another. A non-linear process $T_{mi,mo}$ with XOR mask corresponding to the table number s is defined as $T_{mi,mo}[s]$. Table masks mi and mo corresponding to the table number s are defined as mi[s] and mo[s].

FIRST COMPARATIVE EXAMPLE

Figure 8:
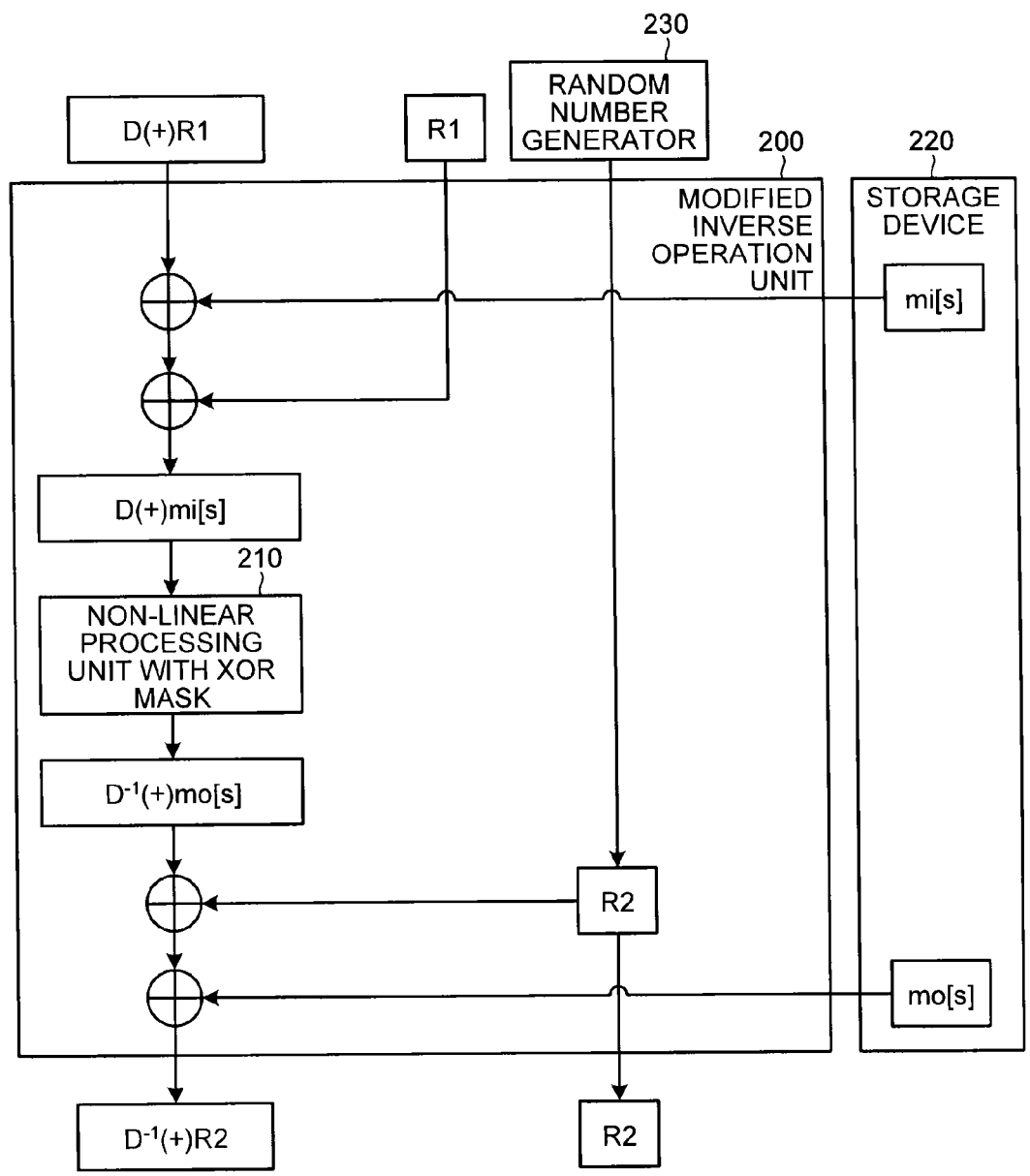
FIG. 8 is a block diagram illustrating a modified inverse operation unit according to a first comparative example.

FIG. 8 is a block diagram illustrating a modified inverse operation unit 200 according to a first comparative example. The modified inverse operation unit 200 in the first comparative example includes a non-linear processing unit 210 with XOR mask that performs a non-linear process $T_{mi,mo}$ with XOR mask. The modified inverse operation unit 200 in the first comparative example reads out from a table mask mi[1] from a storage device 220 in the event that a table number s that is equal to 1 is selected. The modified inverse operation unit 200 replaces the mask data of D (+) R1 from the XOR mask R1 to the table mask mi[1]. The modified inverse operation unit 200 inputs D (+) mi[1] to the non-linear processing unit 210 with XOR mask. Then, the modified inverse operation unit 200 receives a random number R2 as a new XOR mask from a random number generator 230, and reads out the table mask mo[1] from the storage device 220. The modified inverse operation unit 200 replaces the mask data of $D^{-1}$ (+) mo[1], which is output from the non-linear processing unit 210 with XOR mask, from the table mask mo[1] to the XOR mask R2. The modified inverse operation unit 200 consequently outputs $D^{-1}$ (+) R2 and R2.

The modified inverse operation unit 200 in the first comparative example performs the process that is summarized as the following 1 to 5.
1. Input D (+) R1 and R1
2. Replace the mask data
   Select the table number s $D(+)mi[s] \leftarrow (D(+)R1)(+)R1(+)mi[s]$ 3. Non-linear process $T_{mi,mo}$ with XOR mask (inverse operation)

$D^{-1}(+)mo[s]T_{mi,mo}[s](D(+)mi[s])$

4. Replace the mask data
   Input the random number R2

$D^{-1}(+)R2 \leftarrow (D^{-1}(+)mo[s])(+)R2(+)mo[s]$

5. Output $D^{-1}$ (+) R2 and R2

The modified inverse operation unit 200 in the first comparative example masks input and output of the non-linear processing unit 210 with XOR mask using the table masks mi[s] and mo[s]. The non-linear processing unit 210 performs a non-linear process $T_{mi,mo}[s]$ with XOR mask. This process limits the possible table number s to a number of 1 to n, and also limits mi[s] and mo[s], thus reducing randomness. This means increasing risk of success of the side channel attack such as DPA. While the non-linear process $T_{mi,mo}[s]$ with XOR mask is performed in accordance with the selected table number s, the table masks mi and mo are fixed to mi[s] and mo[s]. Accordingly, the mask countermeasure using the table masks mi and mo alone is not able to ensure sufficient safety against the side channel attack. The side channel attack includes differential electro-magnetic analysis (DEMA), which measures a local electromagnetic wave to estimate a secret key similarly to DPA, and also includes high-order DPA, high-order DEMA, and similar analysis that are severer than DPA and DEMA.

SECOND COMPARATIVE EXAMPLE

A modified inverse operation unit according to the second comparative example has a configuration example without the non-linear process $T_{mi, mo}$ with XOR mask. This configuration employs a mask countermeasure that multiplies the non-linear process F (inverse operation) by the mask data (random number) alone. Hereinafter, the multiplication of intermediate data X by mask data R is expressed by X (*) R. This mask data R is referred to as a multiplication mask.

Figure 9:
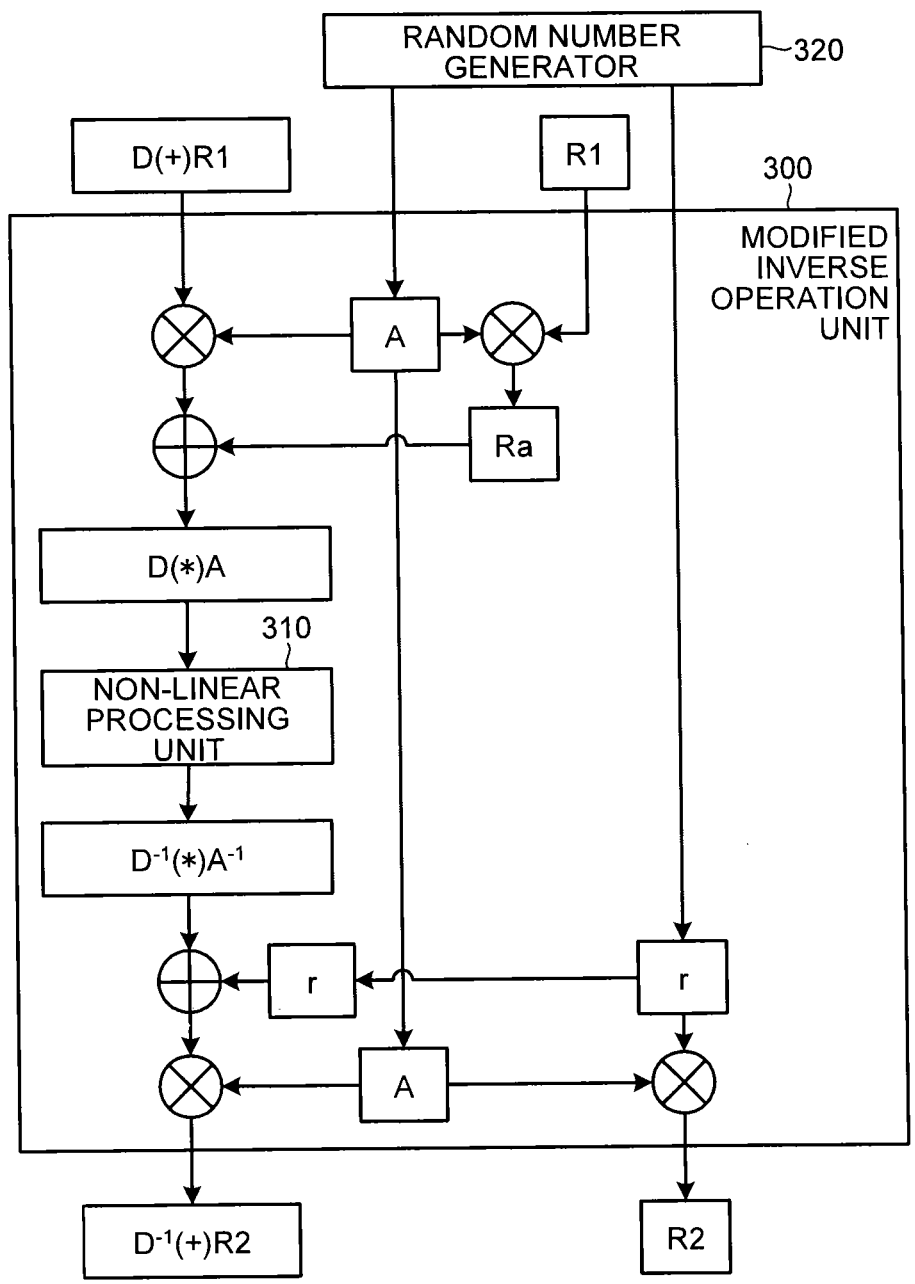
FIG. 9 is a block diagram illustrating a modified inverse operation unit according to a second comparative example.

FIG. 9 is a block diagram illustrating a modified inverse operation unit 300 according to the second comparative example. The modified inverse operation unit 300 in the second comparative example includes a non-linear processing unit 310 that performs a non-linear process F (inverse operation). The modified inverse operation unit 300 in the second comparative example receives a random number A, which is used as the multiplication mask, from a random number generator 320. The modified inverse operation unit 300 replaces mask data of D (+) R1 from an XOR mask R1 to the multiplication mask A. The modified inverse operation unit 300 inputs D (*) A to a non-linear processing unit 310. Subsequently, the modified inverse operation unit 300 receives a random number r from the random number generator 320 to generate a new XOR mask R2. Additionally, the modified inverse operation unit 300 replaces the mask data of $D^{-1}$ (*) $A^{-1}$, which is output from the non-linear processing unit 310, from the multiplication mask A, which is calculated with the inverse operation, to the XOR mask R2. The modified inverse operation unit 300 consequently outputs $D^{-1}$ (+) R2 and R2.

The modified inverse operation unit 300 in the second comparative example performs the process that is summarized as the following 1 to 5.
1. Input D (+) R1 and R1
2. Replace the mask data
   Input the random number A (the multiplication mask)

$Ra \leftarrow R1(*)A$ $D(*)A \leftarrow y((D(+)R1)(*)A)(+)Ra$

3. Nonlinear process F (inverse operation)

$$D^{-1}(*)A^{-1} \leftarrow F(D(*)A)$$

4. Replace the mask data
   Input the random number r $$D^{-1}(+)R2 \leftarrow ((D^{-1}(*)A^1)(+)r)(*)A$$

$$R2 \leftarrow r(*)A$$

5. Output $D^{-1}$ (+) R2 and R2

The modified inverse operation unit 300 in the second comparative example masks input and output of the non-linear processing unit 310, which executes the inverse operation, with the multiplication mask A. The mask countermeasure with the multiplication mask A alone may leak a secret key by an attack that specifies the secret key through the situation below. For example, an operation is performed on the plain text. This operation results in the intermediate data D of zero. Subsequently, the intermediate data D (*) A, which is masked with the multiplication mask A, always becomes zero.

First Embodiment

Figure 10:
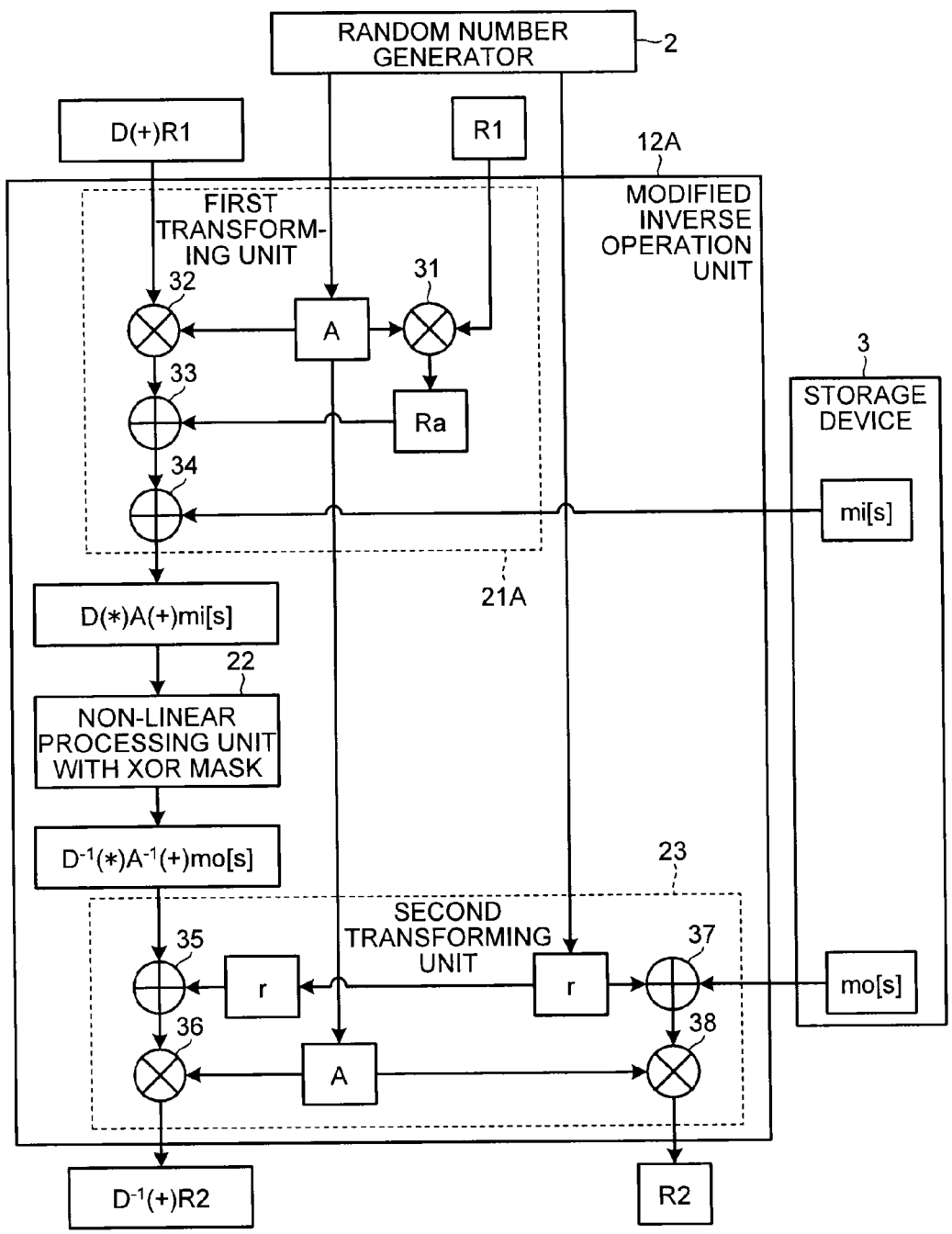
FIG. 10 is a block diagram illustrating a modified inverse operation unit according to a first embodiment.

FIG. 10 is a block diagram illustrating a modified inverse operation unit 12A according to a first embodiment. The modified inverse operation unit 12A in the first embodiment includes a first transforming unit 21A, a non-linear processing unit 22 with XOR mask, and a second transforming unit 23.

The first transforming unit 21A receives D (+) R1 (third data), which is the intermediate data masked by the XOR mask R1, the XOR mask R1 (fourth mask data), and the random number A (first mask data), which is to be used as a multiplication mask generated by the random number generator 2. The first transforming unit 21A uses the multiplication mask A, the table mask mi[s] (second mask data), which is read out from the storage device 3, and the XOR mask R1 so as to transform D (+) R1 into D (*) A (+) mi[s] (first data). That is, the first transforming unit 21A replaces the mask data of D (+) R1 from the XOR mask R1 to the multiplication mask A and the table mask mi[s].

Specifically, the first transforming unit 21A allows an operator 31 to perform, for example, multiplication of the random number A, which is generated by the random number generator 2, and the XOR mask R1. This multiplication gives the data defined as Ra. The first transforming unit 21A allows an operator 32 to multiply the intermediate data of D (+) R1, which is masked with the XOR mask R1, by the random number A. The first transforming unit 21A allows an operator 33 to calculate an exclusive OR between the data obtained by this multiplication and Ra obtained by the multiplication in the operator 31. Additionally, the first transforming unit 21A allows an operator 34 to calculate an exclusive OR between the data obtained by operation of the operator 33 and the table mask mi[s] read out from the storage device 3. This transforms D (+) R1 to D (*) A (+) mi[s].

The non-linear processing unit 22 with XOR mask receives the data of D (*) A (+) mi[s], which is transformed from D (+) R1 by the first transforming unit 21A. The non-linear processing unit 22 with XOR mask performs the non-linear process $T_{mi,mo}[s]$ with XOR mask on D (*) A (+) mi[s] so as to output $D^{-1}$ (*) $A^{-1}$ (+) mo[s] (second data). The non-linear process F (inverse operation) obtains $D^{-1}$ (*) $A^{-1}$ from F(D (*) A) with its mathematical property. Accordingly, in the case where the non-linear process F is replaced with the non-linear process $T_{mi,mo}$ with XOR mask, the process obtains $D^{-1}$ (*) $A^{-1}$ (+) mo from $T_{mi,mo}$ (D (*) A (+) mi). Here, the symbol of (*) expresses the multiplication on the extension field $GF(2^8)$. The mo[s] (third mask data) is associated with the table mask mi[s] by the table with the table number s.

The second transforming unit 23 receives $D^{-1}$ (*) $A^{-1}$ (+) mo[s], which is output from the non-linear processing unit 22 with XOR mask, the multiplication mask A, and the random number r, which is generated by the random number generator 2. The second transforming unit 23 uses the multiplication mask A and the random number r so as to transform $D^{-1}$ (*) $A^{-1}$ (+) mo[s] to the data of $D^{-1}$ (+) R2 (fourth data), thus outputting the transformed data. Additionally, the second transforming unit 23 uses the random number r, the table mask mo[s], which is read out from the storage device 3, and the multiplication mask A so as to calculate the XOR mask R2 (fifth mask data), thus outputting calculated data. That is, the second transforming unit 23 generates the new XOR mask R2, and replaces the mask data of $D^{-1}$ (*) A (+) mo[s] from the multiplication mask $A^{-1}$ and the table mask mo[s], which are processed by the inverse operation, to the XOR mask R2.

Specifically, the second transforming unit 23 allows an operator 35 to calculate, for example, an exclusive OR between $D^{-1}$ (*) $A^{-1}$ (+) mo[s], which is output from the non-linear processing unit 22 with XOR mask, and the random number r, which is generated from the random number generator 2. Then, the second transforming unit 23 allows an operator 36 to multiply the data obtained in the operation by the random number A, thus transforming $D^{-1}$ (*) $A^{-1}$ (+) mo[s] to $D^{-1}$ (+) R2. The second transforming unit 23 allows an operator 37 to calculate an exclusive OR between the random number r and the table mask mo[s], which is read out from the storage device 3. Then, the second transforming unit 23 allows an operator 38 to multiply the data obtained in the operation by the random number A so as to generate the new XOR mask R2. The random number r, which is used for operation in the second transforming unit 23, is used for additionally increasing randomness of output in the modified inverse operation unit 12A. The second transforming unit 23 may perform operation without the random number r. In this case, the new XOR mask R2 is generated by the multiplication between the random number A and the table mask mo[s].

The modified inverse operation unit 12A of the first embodiment performs the process that is summarized as the following 1 to 5.

1. Input D (+) R1 and R1
2. Replace the mask data
   Select the table number s
   Input the random number A (the multiplication mask)

$$Ra \leftarrow R1(*)A$$

$$D(*)A(+)mi[s] \leftarrow ((D(+)R1)(*)A)(+)Ra(+)mi[s]$$

3. Non-linear process $T_{mi,mo}$ with XOR mask (inverse operation)

$$D^{-1}(*)A^1(+)mo[s] \leftarrow T_{mi,mo}[s](D(*)A(+)mi[s])$$

4. Replace the mask data
   Input the random number r $$D^{-1}(+)R2 \leftarrow ((D^{-1}(*)A^1(+)mo[s])(+)r)(*)A$$

$$R2(mo[s](+)r)(*)A$$

5. Output $D^{-1}$ (+) R2 and R2

As described above, the modified inverse operation unit 12A in the first embodiment masks input and output of the non-linear processing unit 22 with XOR mask using not only the table masks mi[s] and mo[s] but also the multiplication mask A. Here, the multiplication mask A may take any data (8-bit variable) other than zero. This increases randomness in the non-linear processing unit 22 with XOR mask. Accordingly, the cryptographic processing apparatus with the modified inverse operation unit 12A of the first embodiment ensures enhanced security against the side channel attack. The cryptographic processing apparatus with the modified inverse operation unit 12A of the first embodiment increases randomness in the non-linear processing unit 22 with XOR mask. This also ensures sufficient safety against the side channel attack. The side channel attack includes DEMA, which measures a local electromagnetic wave to estimate a secret key similarly to DPA, and also includes high-order DPA, high-order DEMA, and similar analysis that are severer than DPA and DEMA. Additionally, the cryptographic processing apparatus with the modified inverse operation unit 12A of the first embodiment also ensures sufficient safety against a possible attack in the case of masking input and output with the multiplication mask A alone in the non-linear process.

The process in the modified inverse operation unit 12A of the first embodiment includes the non-linear process $T_{mi,mo}[s]$ with XOR mask (inverse operation), the exclusive OR, and the multiplication. The exclusive OR among these processes is light-load operation. In view of this, processing cost mainly includes one inverse operation and four multiplications. This processing cost includes four more multiplications than the processing cost for the modified inverse operation unit 200 of the first comparative example.

Second Embodiment

Figure 11:
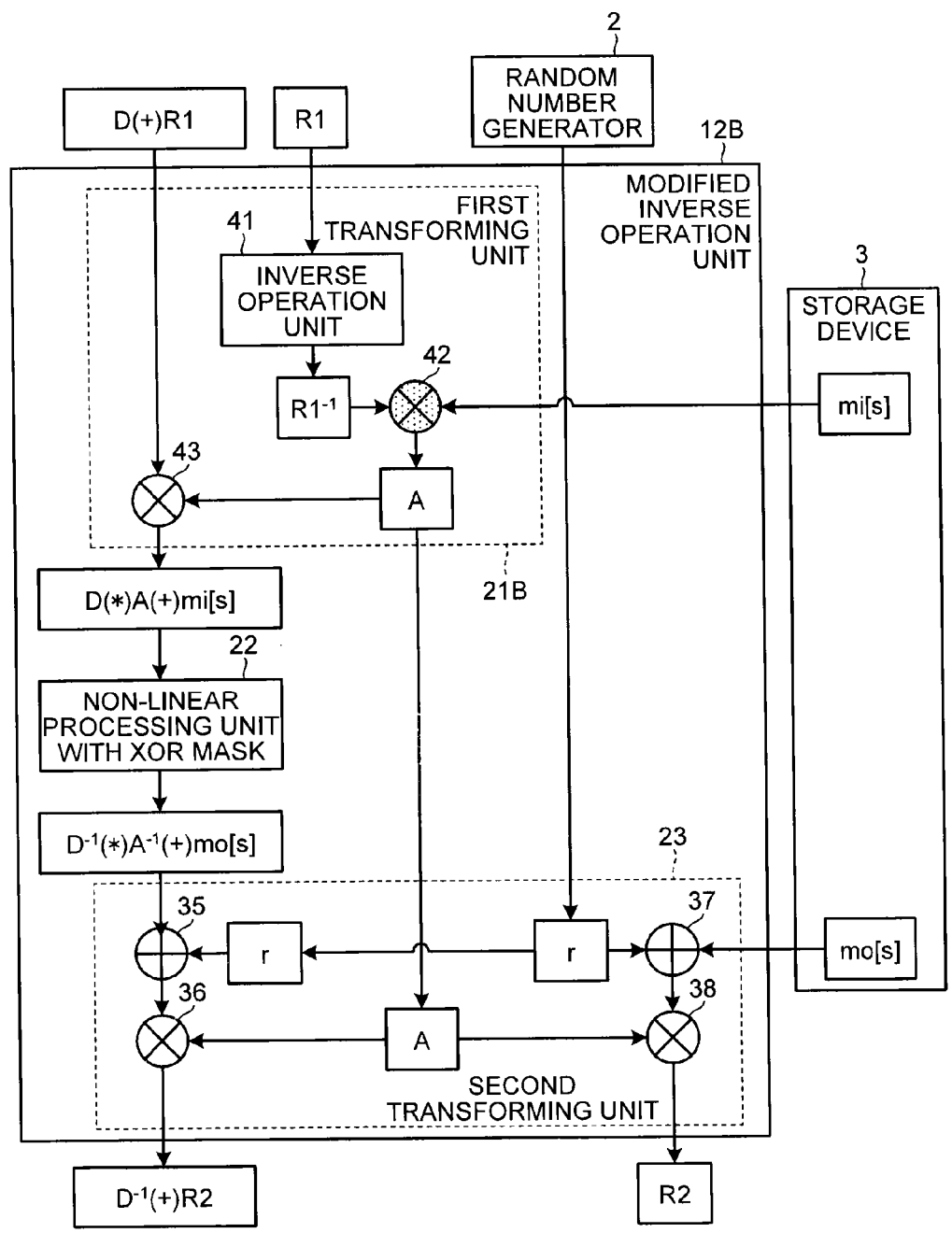
FIG. 11 is a block diagram illustrating a modified inverse operation unit according to a second embodiment.

FIG. 11 is a block diagram illustrating a modified inverse operation unit 12B according to a second embodiment. The modified inverse operation unit 12B in the second embodiment includes a first transforming unit 21B, a non-linear processing unit 22 with XOR mask, and a second transforming unit 23. The non-linear processing unit 22 with XOR mask and the second transforming unit 23 are similar to those in the first embodiment, and such elements will not be further elaborated here.

Similarly to the first transforming unit 21A in the modified inverse operation unit 12A of the first embodiment, the first transforming unit 21B uses the multiplication mask A, the table mask mi[s], which is read out from the storage device 3, and the XOR mask R1 so as to transform D (+) R1 to D (*) A (+) mi[s]. However, the first transforming unit 21B does not use the random number generated from the random number generator 2 as the multiplication mask A. The first transforming unit 21B obtains the multiplication mask A by calculation.

Specifically, the first transforming unit 21B performs, for example, the inverse operation on the XOR mask R1 by an inverse operation unit 41 (a first operator). This allows the first transforming unit 21B to obtain the reciprocal $R1^{-1}$ of the XOR mask R1 on the extension field $GF(2^8)$. Subsequently, the first transforming unit 21B allows an operator 42 (a second operator) to multiply $R1^{-1}$, which is obtained by the inverse operation in the inverse operation unit 41, and the table mask mi[s], which is read out from the storage device 3. This multiplication gives the obtained data defined as the multiplication mask A. The first transforming unit 21B allows an operator 43 (a third operator) to multiply the intermediate data of D (+) R1, which is masked with the XOR mask R1, and the multiplication mask A, which is obtained by the multiplication in the operator 42. This transforms D (+) R1 to D (*) A (+) mi[s].

The modified inverse operation unit 12B of the second embodiment performs the process that is summarized as the following 1 to 5.

1. Input D (+) R1 and R1
2. Replace the mask data
   Select the table number s $R1^{-1} \leftarrow \text{inverse operation}(R1)$ $A \leftarrow R1^{-1}(*)mi[s]$ $D(*)A(+)mi[s](D(+)R1)(*)A$ 3. Non-linear process $T_{mi,mo}$ with XOR mask (inverse operation)

$D^{-1}(*)A^{-1}(+)mo[s] \leftarrow T_{mi,mo}[s](D(*)A(+)mi[s]$

4. Replace the mask data
   Input the random number r $D^{-1}(+)R2 \leftarrow ((D^{-1}(*)A(+)mo[s])(+)r)(*)A$ $R2 \leftarrow (mo[s](+)r)(*)A$ 5. Output $D^{-1}$ (+) R2 and R2

As described above, the modified inverse operation unit 12B in the second embodiment masks input and output of the non-linear processing unit 22 with XOR mask using not only the table masks mi[s] and mo[s] but also the multiplication mask A. Similarly to the modified inverse operation unit 12A in the first embodiment, this process increases randomness in the non-linear processing unit 22 with XOR mask. Accordingly, the cryptographic processing apparatus with the modified inverse operation unit 12B of the second embodiment ensures the advantageous effects, similarly to the cryptographic processing apparatus with the modified inverse operation unit 12A of the first embodiment.

The modified inverse operation unit 12B of the second embodiment uses $R1^{-1}$ (*) mi[s], which is obtained from the XOR mask R1 and the table mask mi[s], as the multiplication mask A. Accordingly, the process that replaces the mask data of the intermediate data of D (+) R1, which is masked with the XOR mask R1, is performed by only one multiplication. This facilitates the process to replace the mask data. The side channel attack performs an operation on the intermediate data D, thus causing leakage of the secret key. Accordingly, facilitating the process that replaces the mask data consequently improve resistance to the side channel attack.

The operation of the operator 42 to generate the multiplication mask A is multiplication of the XOR mask R1 and the table mask mi[s]. This allows replacing ordinary multiplication by a light-load operation that depends on the predetermined data mi[s]. This reduction of the processing in the operator 42 leads to reduction in circuit size and data path length for hardware implementation, and also leads to reduction in processing time for software implementation.

In the modified inverse operation unit 12B of the second embodiment, the multiplication mask A is calculated. This saves processing cost for generating the random number in the random number generator 2 compared with the first embodiment. This consequently provides the needed random number with the same bit length as that of the first comparative example, which does not employ the mask countermeasure with the multiplication mask, even in the case where the configuration employs the mask countermeasure with the multiplication mask.

Processing cost in the modified inverse operation unit 12B of the second embodiment mainly includes two inverse operations and three multiplications (except the light-load operation). This processing cost includes one more inverse operation and three more multiplications in addition to the processing cost for the modified inverse operation unit 200 of the first comparative example.

Third Embodiment

Figure 12:
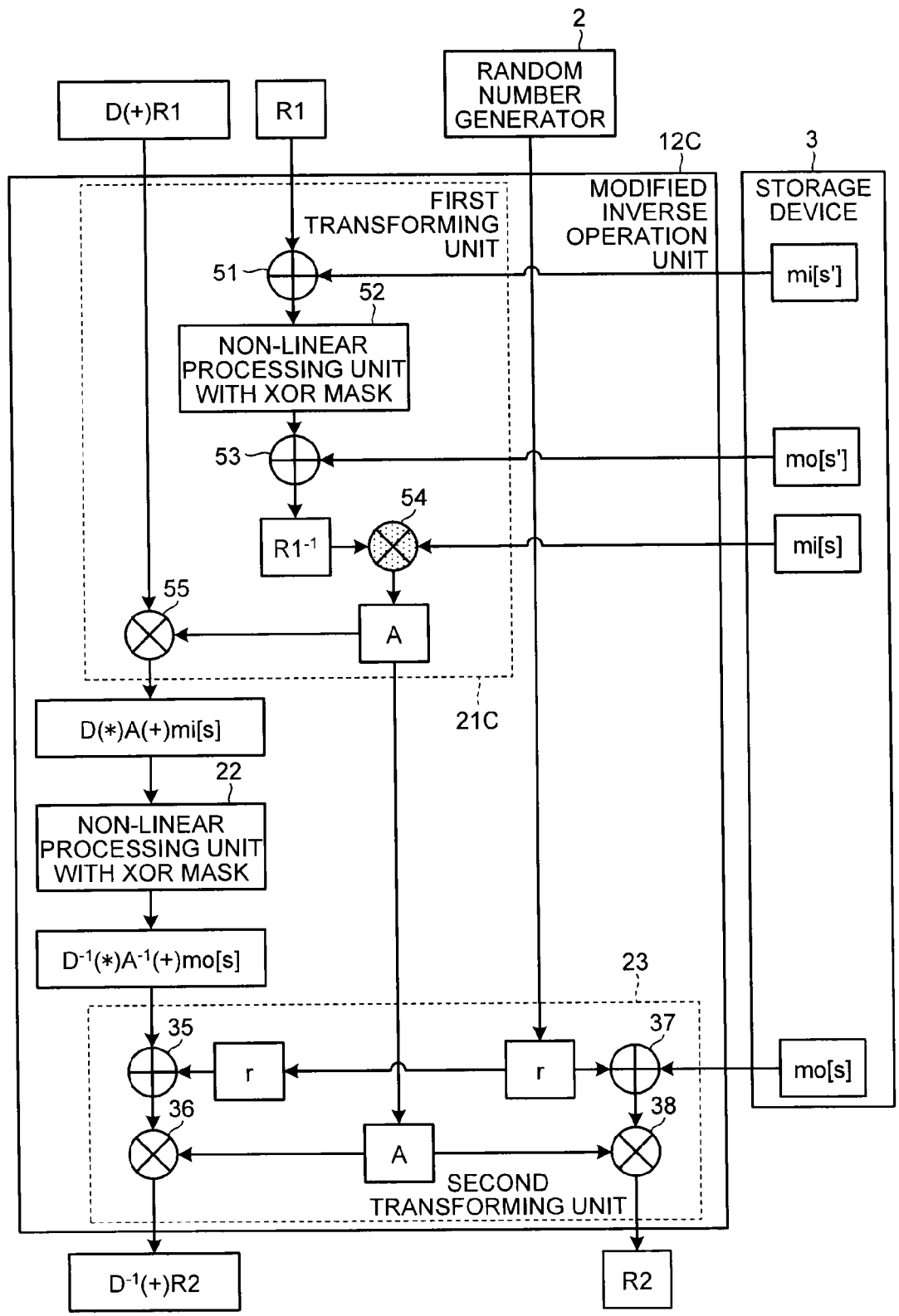
FIG. 12 is a block diagram illustrating a modified inverse operation unit according to a third embodiment.

FIG. 12 is a block diagram illustrating a modified inverse operation unit 12C according to a third embodiment. The modified inverse operation unit 12C in the third embodiment includes a first transforming unit 21C, a non-linear processing unit 22 with XOR mask, and a second transforming unit 23. The non-linear processing unit 22 with XOR mask and the second transforming unit 23 are similar to those in the first embodiment and the second embodiment, and such elements will not be further elaborated here.

The first transforming unit 21C is configured to obtain the multiplication mask A by operation, similarly to the first transforming unit 21B in the modified inverse operation unit 12B of the second embodiment. However, the first transforming unit 21C utilizes the configuration where the non-linear processing unit 22 with XOR mask performs the non-linear process $T_{mi,mo}[s]$ with XOR mask (inverse operation) using one (the table number s) of a plurality of tables ("n" sets of tables). Accordingly, the first transforming unit 21C performs the non-linear process $T_{mi,mo}[s']$ with XOR mask instead of the inverse operation, using another table (a table number s') that is not used by the non-linear processing unit 22 with XOR mask. This eliminates the need for the inverse operation unit 41 of the first transforming unit 21B in the modified inverse operation unit 12B of the second embodiment.

Specifically, the first transforming unit 21C, for example, allows an operator 51 to operate an exclusive OR between the XOR mask R1 and the table mask mi[s'], which is read from the storage device 3. The first transforming unit 21C performs the non-linear process $T_{mi,mo}[s']$ with XOR mask in a non-linear processing unit 52 with XOR mask, with respect to the data obtained in the operation by the operator 51. The first transforming unit 21C allows an operator 53 to operate an exclusive OR between the data obtained in the process in the non-linear processing unit 52 with XOR mask and the table mask mo[s'], which is read from the storage device 3. Then, the first transforming unit 21C obtains the reciprocal $R1^{-1}$ of the XOR mask R1 on the extension field $GF(2^8)$. Then the first transforming unit 21C allows an operator 54 to multiply the obtained $R1^{-1}$ by the table mask mi[s], which is read from the storage device 3, similarly to the first transforming unit 21B in the modified inverse operation unit 12B of the second embodiment. The data obtained in the multiplication is defined as the multiplication mask A. Subsequently, the first transforming unit 21C allows an operator 55 to multiply the intermediate data of D (+) R1, which is masked with the XOR mask R1, by the multiplication mask A, which is obtained by the multiplication in the operator 54. This transforms D (+) R1 into D (*) A (+) mi[s].

The modified inverse operation unit 12C of the third embodiment performs the process that is summarized as the following 1 to 5.
1. Input D (+) R1 and R1
2. Replace the mask data
   Select the table numbers s and s'

$R1^{-1} \leftarrow T_{mi,mo}[s'](R1(+)mi[s'])(+)mo[s']$ $A \leftarrow R1^{-1}(*)mi[s]$ $D(*)A(+)mi[s](D(+)R1)(*)A$ 3. Non-linear process $T_{mi,mo}$ with XOR mask (inverse operation)

$D^{-1}(*)A^{-1}(+)mo[s] \leftarrow T_{mi,mo}[s](D(*)A(+)mi[s])$

4. Replace the mask data
   Input the random number r $D^{-1}(+)R2 \leftarrow ((D^{-1}(*)A^{-1}(+)mo[s])(+)r)(*)A$ $R2 \leftarrow (mo[s](+)r)(*)A$ 5. Output $D^{-1}$ (+) R2 and R2

As described above, the modified inverse operation unit 12C in the third embodiment masks input and output of the non-linear processing unit 22 with XOR mask using not only the table masks mi[s] and mo[s] but also the multiplication mask A. Similarly to the modified inverse operation unit 12A in the first embodiment and the modified inverse operation unit 12B in the second embodiment, this increases randomness in the non-linear processing unit 22 with XOR mask. Accordingly, the cryptographic processing apparatus with the modified inverse operation unit 12C of the third embodiment ensures the advantageous effects, similarly to the cryptographic processing apparatus with the modified inverse operation unit 12A of the first embodiment and the cryptographic processing apparatus with the modified inverse operation unit 12B of the second embodiment.

The modified inverse operation unit 12C of the third embodiment uses $R1^{-1}$ (*) mi[s], which is obtained from the XOR mask R1 and the table mask mi[s], as the multiplication mask A. Accordingly, this modified inverse operation unit 12C ensures the advantageous effects, similarly to the cryptographic processing apparatus with the modified inverse operation unit 12B of the second embodiment.

Additionally, the modified inverse operation unit 12C of the third embodiment uses the other table (the table number s') that is not used by the non-linear processing unit 22 with XOR mask. Subsequently, the modified inverse operation unit 12C performs the non-linear process $T_{mi,mo}$ with XOR mask[s'] instead of inverse operation that is performed by the first transforming unit 21B in the modified inverse operation unit 12B of the second embodiment. This consequently reduces the processing cost compared with the modified inverse operation unit 12B of the second embodiment. That is, in the countermeasure against the side channel attack, controlling stop of unselected tables among "n" sets of tables in the non-linear process $T_{mi,mo}$ with XOR mask increases a risk of success of the attack. Accordingly, a dummy process that uses the unselected table is frequently performed. The modified inverse operation unit 12C of the third embodiment simply allows the non-linear processing unit 52 with XOR mask to perform one of the dummy processes. Accordingly, if the modified inverse operation unit 200 of the first comparative example performs the dummy process, this processing cost includes three more multiplications in addition to the processing cost for the modified inverse operation unit 200 of the first comparative example.

The cryptographic processing apparatus of the embodiment described above has hardware configuration with an ordinary computer, and all or a part of the above-described respective constituents are implemented using a program executed by the computer.

The program that achieves the respective constituents of the above-described cryptographic processing apparatus is provided as a file in an installable format or an executable format. This program is stored in a computer-readable media such as a CD-ROM, a flexible disk (FD), a CD-R, and a digital versatile disc (DVD).

The program, which achieves the respective constituents of the cryptographic processing apparatus in each embodiment described above, may be stored on a computer coupled to a network such as the Internet, and may be downloaded through the network. The program, which achieves the respective constituents of the cryptographic processing apparatus in each embodiment described above, may be provided or distributed through a network such as the Internet. Additionally, the program, which achieves the respective constituents of the cryptographic processing apparatus in each embodiment described above, may be preliminarily stored in a ROM or a similar storage.

The program, which achieves the respective constituents of the cryptographic processing apparatus in each embodiment described above, has a module configuration to implement the respective constituents described above on a computer. As actual hardware, for example, a CPU (processor) is configured to read out and execute the program in the storage device to load a component to a main memory, thus implementing the respective constituents of the cryptographic processing apparatus on the main memory.

As described above using the concrete examples, the cryptographic processing apparatus in each embodiment ensures enhanced security against the side channel attack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cryptographic processing apparatus for performing a plurality of processes to encrypt plain text or decrypt cipher text, the plurality of processes including a non-linear process using multiplication, wherein the non-linear process is a process performed using intermediate data masked with mask data, the intermediate data being data in a middle of the plurality of processes, the mask data hiding the intermediate data, the apparatus comprising:
    a hardware processor including
        a non-linear processing unit configured to
            receive first data that is an exclusive OR of A and B, where A is a product of the intermediate data and first mask data and B is second mask data, the first mask data being a random number or a value based on the random number,
            perform the non-linear process, which is one of the plurality of processes to encrypt plain text or decrypt cipher text, on the first data to generate second data that is an exclusive OR of C and D, where C is a product of data obtained by the non-linear process on the intermediate data and data obtained by the non-linear process on the first mask data and D is third mask data having a predetermined correspondence relation with the second mask data, and
            output the second data.

2. The apparatus according to claim 1, wherein the hardware processor includes:
    a first transforming unit configured to
        receive third data and fourth mask data, the third data being an exclusive OR of the intermediate data and the fourth mask data,
        transform the third data into the first data by using the first mask data, the second mask data, and the fourth mask data, and
        input the first data being transformed from the third data to the non-linear processing unit; and
    a second transforming unit configured to
        transform the second data output from the non-linear processing unit into fourth data by using the first mask data, the fourth data being an exclusive OR of the data obtained by the non-linear process on the intermediate data and a fifth mask data,
        output the fourth data being transformed from the second data, and
        operate and output the fifth mask data by using the first mask data and the third mask data.

3. The apparatus according to claim 2, wherein the first transforming unit includes
    a first operator configured to perform an inverse operation on the fourth mask data;
    a second operator configured to multiply data obtained by the inverse operation on the first operator and the second mask data to calculate the first mask data; and
    a third operator configured to multiply the third data and the first data calculated by the second operator to obtained the first data.

4. The apparatus according to claim 3, wherein
    the non-linear processing unit selects one of a plurality of tables that determined a correspondence relation between the second mask data and the third mask data, and transformed the first data into the second data based on the selected table and
    the first operator performs the inverse operation on the fourth mask data based on a table other than the table selected by the non-linear processing unit out of the plurality of tables.

5. The apparatus according to claim 1, wherein the non-linear process includes an inverse operation.

* * * * *